(12) United States Patent
License et al.

(10) Patent No.: US 11,807,048 B2
(45) Date of Patent: Nov. 7, 2023

(54) TIRE, THE SIDEWALL OF WHICH COMPRISES RIBS

(71) Applicant: COMPAGNIE GENERALE DES ETABLISSEMENTS MICHELIN, Clermont-Ferrand (FR)

(72) Inventors: William License, Clermont-Ferrand (FR); Jacques Babaud, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 277 days.

(21) Appl. No.: 16/765,853

(22) PCT Filed: Nov. 22, 2018

(86) PCT No.: PCT/FR2018/052952
§ 371 (c)(1),
(2) Date: May 20, 2020

(87) PCT Pub. No.: WO2019/102151
PCT Pub. Date: May 31, 2019

(65) Prior Publication Data
US 2020/0361250 A1   Nov. 19, 2020

(30) Foreign Application Priority Data
Nov. 22, 2017 (FR) .................. 17/61040

(51) Int. Cl.
*B60C 13/02* (2006.01)
*B60C 13/00* (2006.01)
*B60C 1/00* (2006.01)

(52) U.S. Cl.
CPC ............ *B60C 13/02* (2013.01); *B60C 13/002* (2013.01); *B60C 1/0025* (2013.01)

(58) Field of Classification Search
CPC ....... B60C 13/02; B60C 13/002; B60C 11/01; B60C 11/1307; B60C 2011/133; B60C 2011/1338; B60C 2013/007; B60C 1/0025
See application file for complete search history.

(56) References Cited

U.S. PATENT DOCUMENTS

| 10,221,297 B2 | 3/2019 | Randall et al. |
| 2001/0017178 A1 | 8/2001 | Suzuki |

(Continued)

FOREIGN PATENT DOCUMENTS

| CN | 107001707 | 8/2017 |
| JP | 61081207 | 4/1986 |

(Continued)

OTHER PUBLICATIONS

Matsuyama, English Machine Translation of JP 2003011620, 2003 (Year: 2003).*

(Continued)

*Primary Examiner* — Justin R Fischer
*Assistant Examiner* — Brendon Charles Darby
(74) *Attorney, Agent, or Firm* — Cozen O'Connor

(57) ABSTRACT

Tire (1) comprising a carcass reinforcement (2) surmounted by a crown reinforcement (3), itself capped by a tread (7), the said tread being connected to two beads (6) via two sidewalls (4) each having an exterior surface (40), at least one of the said sidewalls comprising at least two circumferential protrusions (5a, 5b, 5c), each sidewall (4) comprising an equator point (E) situated on the exterior surface of the sidewall radially at the same position as the axially outermost point (20) of the carcass reinforcement (2) in the unladen reference configuration, each circumferential protrusion (5a, 5b, 5c) being bounded by a radially upper wall (51), by a radially lower wall (52), and by a connecting wall (Continued)

(53) situated between the radially upper wall (51) and the radially lower wall (52) tire.

13 Claims, 4 Drawing Sheets

(56) References Cited

U.S. PATENT DOCUMENTS

2013/0263993 A1   10/2013  Niwa
2016/0108212 A1*   4/2016  Busch ................ C08L 91/06
                                              524/526

FOREIGN PATENT DOCUMENTS

| JP | 2000016032 A | * | 1/2000 |
| JP | 2003 011620 | | 1/2003 |
| JP | 2008126699 A | * | 6/2008 |
| JP | 2011 084144 | | 4/2011 |
| JP | 2014 118062 | | 6/2014 |

OTHER PUBLICATIONS

Motoi, English Machine Translation of JP 2011084144, 2011 (Year: 2011).*

Miyazaki, English Machine Translation of JP 2000016032, 2000 (Year: 2000).*

Tanaka, English Machine Translation of JP 2008126699, 2008 (Year: 2008).*

* cited by examiner

TIRE, THE SIDEWALL OF WHICH COMPRISES RIBS

RELATED APPLICATIONS

This is a U.S. National Phase Application under 35 USC 371 of International Application PCT/FR2018/052952 filed on Nov. 22, 2018.

This application claims the priority of French application no. 17/61040 filed Nov. 22, 2017, the entire content of which is hereby incorporated by reference.

BACKGROUND OF THE INVENTION

The present invention relates to a tire and, more particularly, to a tire used on worksites, such as, for example, for lorries, tractors or their trailers.

In general terms, a tire is an object with a geometry exhibiting symmetry of revolution about an axis of rotation. A tire comprises two beads intended to be mounted on a rim; it also comprises two sidewalls connected to the beads and a crown having a tread intended to come into contact with the ground, the crown having a first side connected to the radially outer end of one of the two sidewalls and a second side connected to the radially outer end of the other of the two sidewalls.

The makeup of a tire is usually described by a representation of its constituent components in a meridian plane, that is to say a plane containing the axis of rotation of the tire. The radial, axial and circumferential directions respectively denote the directions perpendicular to the axis of rotation of the tire, parallel to the axis of rotation of the tire and perpendicular to any meridian plane. In the following text, the expressions "radially", "axially" and "circumferentially" respectively mean "in a radial direction", "in the axial direction" and "in a circumferential direction" of the tire. The expressions "radially inner, respectively radially outer" mean "closer to, respectively further away from, the axis of rotation of the tire, in a radial direction". The median plane is a plane perpendicular to the axis of revolution of the tire, positioned axially in such a way as to intersect the surface of the tread substantially mid-way between the beads. The expressions "axially inner, respectively axially outer" mean "closer to, respectively further away from, the median plane of the tire, in the axial direction".

Tires intended to be fitted to vehicles running "off-road" notably in building and civil engineering work sites generally comprise various reinforcements or protectors in their side walls, so as to make them more resistant to attack, in particular makes them more resistant to cutting by cutting or sharp metallic objects such as metal rods, for example pieces of concrete reinforcing bars.

For example, document JP61081207, discloses the addition, in the zone extending from 30% up to 75% of the height of the sidewall, three or more than three circumferential ribs, of rounded meridian section, protruding from the exterior surface of the sidewall. Likewise, document US20130263993, discloses a tire of which the radially upper part of the sidewall comprises a set of ribs forming a protector, each rib having a meridian cross section in the appearance of a right-angled triangle, of which the substantially right-angled vertex corner is positioned radially towards the inside, the base of the right-angled triangle being substantially coincident with the exterior face of the sidewall, the long side of the right-angled triangle being arranged radially towards the outside, and the short side of the right-angled triangle being positioned radially towards the inside.

An object of the invention is to provide a tire with a reduced mass without compromising its ability to withstand attack in "off-road" use.

SUMMARY OF THE INVENTION

This objective is achieved, according to an embodiment of the invention, by a tire comprising a carcass reinforcement surmounted by a crown reinforcement, itself capped by a tread, the said tread being connected to two beads via two sidewalls each having an exterior surface, at least one of the said sidewalls comprising at least two circumferential protrusions, each sidewall comprising an equator point situated on the exterior surface of the sidewall radially at the same position as the axially outermost point of the carcass reinforcement in the unladen reference configuration, each circumferential protrusion being bounded by a radially upper wall, by a radially lower wall, and by a connecting wall situated between the radially upper wall and the radially lower wall, each circumferential protrusion being characterized in that:

- the connecting wall is substantially parallel to the carcass reinforcement considered axially facing the said connecting wall,
- the radially upper wall is planar,
- the height of each circumferential protrusion, measured in a direction substantially perpendicular to the carcass reinforcement from the said exterior surface is greater than the least of 0.8 times the total thickness of the sidewall as measured at the equator and 4 mm, and less than the most of 1.6 times the said thickness and 8 mm,
- in the meridian plane at the centre of the contact patch of the tire in the compressed configuration, the angle α formed by the radially exterior wall with the radial direction is, in the case of the radially outermost protrusion, greater than 95°,
- the radially innermost position of the connecting wall of the radially innermost protrusion is situated radially on the outside of the equator point.

The equator point of the sidewall that is referred to in this document is the point situated on the surface of the sidewall just facing the equator of the carcass reinforcement, the equator of the carcass reinforcement being the point on the axially exterior surface of the carcass reinforcement that is situated axially furthest towards the outside of the tire. This equator point can be identified for example by tomography of the tire mounted on a reference rim and inflated to the nominal pressure (refer to the ETRTO standards) in the unladen reference configuration. Each sidewall comprises such an equator point, situated on the exterior surface of the sidewall, radially at the same position as the axially outermost point of the carcass reinforcement; if the latter comprises several carcass layers, often referred to as "plies", then it is the axially outermost layer that will be considered.

It is indicated above that the radially upper wall is substantially planar. What that means is that a small curvature also makes it possible to achieve the result targeted by the invention. In order to gain a clear understanding of how the profile is mapped in order to determine the angle formed by the radially exterior wall of each protrusion with the radial direction, the reader is referred to the description of the figures which is given hereinbelow.

In one advantageous embodiment of the invention, for each protrusion, the curvilinear length of the connecting wall is greater than 50% of the height of the protrusion; it has been found experimentally that, as a rule of good practice, for each protrusion, the curvilinear length of the connecting wall is advantageously greater than 1.5 times and even 2.5 times the height of the protrusion.

The protection of the tire proves notable if each sidewall comprises at least three protrusions.

As for the angle α formed with the radial direction by the radially exterior wall of the radially outermost protrusion portion, this is preferably greater than 105°.

When considering the set of protrusions on each sidewall, as a preference, the angle formed with the radial direction by the radially outer wall of said protrusions is advantageously decreasing in value when moving on from one protrusion to the next in the direction toward the equator, namely when moving on radially inward.

Let it also be noted that, as a preference, the smallest value for the angle α, for all of the protrusions, is greater than 90°.

For the most economical implementation of the invention, each protrusion is made up of the same rubber compound as the part of the sidewall that forms the said exterior surface. By way of example, the make-up of the external sidewall of the tire according to the invention comprises one or more diene elastomers. It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

However, if the performance of the tire is to be improved still further in terms of its resistance to damage by metalwork, in order to encourage such metalwork to slide off it, each protrusion (or at least to those that are radially outermost) comprises a rubber composition that contains at least 8 phr of anti-ozone wax.

The anti-ozone wax that can be used in the context of the present invention can be, in particular, a natural wax, a synthetic wax or a mixture of natural wax and synthetic wax. For example, the anti-ozone wax can be a natural wax selected from the group consisting of mineral waxes, such as paraffin waxes, plant waxes, animal waxes, and mixtures thereof. The anti-ozone wax can also be a synthetic wax selected from the group consisting of Fischer-Tropsch waxes, polyethylene waxes, and mixtures thereof.

Advantageously, the anti-ozone wax is selected from the group consisting of paraffin waxes, Fischer-Tropsch waxes, and mixtures thereof. Preferably, the anti-ozone wax is a paraffin wax or a mixture of paraffin waxes.

Advantageously, the anti-ozone wax predominantly comprises, and advantageously consists of, linear or branched hydrocarbon-based chains of which the number of carbon atoms is within a range extending from 18 to 70, preferably from 18 to 65, more preferably from 18 to 60, preferably from 18 to 55, preferably from 18 to 50, preferably from 22 to 38. Preferably, the hydrocarbon-based chains of the anti-ozone wax are essentially saturated. In the context of the present invention, the term "essentially saturated" is intended to mean a diene unit content of less than 15%, preferably less than 10%, preferably less than 5%, for example 0%.

The ratio of branched (iso)/unbranched (normal) hydrocarbon-based chains in the anti-ozone wax may be within a range extending from 0/100 to 80/20, preferably from 5/95 to 65/35, more preferably from 5/95 to 36/65, even more preferentially from 5/95 to 20/80.

Such anti-ozone waxes are commercially available, for example the Redezon waxes (for example the 500, PWM-80, 7335-G and 7812 series) from the company Repsol, the Varazon waxes (for example the 5998, 4959 and 6810 series) from the company Sasol, the Ozoace 0355 wax from the company Nippon Seiro, and the OK2122 or OK5258H wax from the company Paramelt Co., Ltd.

Or else, advantageously, each protrusion comprises a rubber compound containing an amide of formula (I):

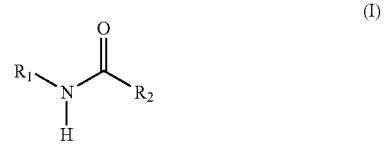

where $R_1$ represents:
  a linear or branched alkylene radical containing 1 to 6 carbon atoms substituted with an amide radical of formula (II),

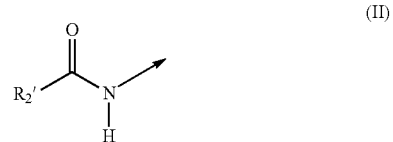

in which:
  $R_2'$ represents a linear or branched hydrocarbon radical comprising from 12 to 24 carbon atoms, and
  the arrow (→) represents the point of attachment of the amide radical of formula (II);
  a linear or branched alkyl radical comprising from 1 to 6 carbon atoms, or
  a hydrogen atom:
  where $R_2$ represents a linear or branched hydrocarbon radical comprising from 12 to 24 carbon atoms.

What is meant in the context of the present invention by a "linear or branched alkylene radical comprising from 1 to 6 carbon atoms" is a bivalent, linear or branched hydrocarbon chain containing 1 to 6 carbon atoms. By way of example, particular mention may be made of the groups —(CH$_2$)—, —(CH$_2$)$_2$—, —(CH$_2$)$_3$—, —(CH$_2$)$_4$—, —(CH$_2$)$_5$—, —(CH$_2$)$_6$—, —CH$_2$—CH(CH$_3$)—, —CH$_2$—CH(CH$_3$)—CH$_2$—, —(CH$_2$)$_2$—CH(CH$_3$)—CH$_2$—, —(CH$_2$)$_2$—CH(CH$_3$)—(CH$_2$)$_2$—.

What is meant in the context of the present invention by a "linear or branched alkyl group comprising from 1 to 6 carbon atoms" is a monovalent, linear or branched hydrocarbon chain containing 1 to 6 carbon atoms. Mention may be made, especially by way of example, of the methyl, ethyl, propyl, butyl, isobutyl, pentyl or hexyl groups.

According to whether $R_1$ represents:
  a linear or branched alkylene radical containing 1 to 6 carbon atoms substituted with an amide radical of formula (II),
  a linear or branched alkyl radical comprising from 1 to 6 carbon atoms, or
  a hydrogen atom,
the amide of formula (I) is respectively represented by formulae (III), (IV) or (V):

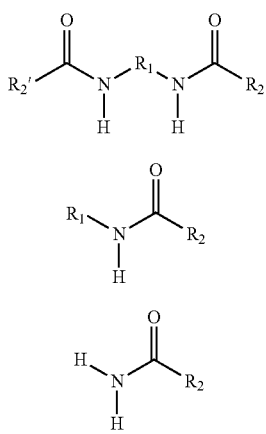

in which $R_2$ and $R_2'$ represent, independently of one another, a linear or branched hydrocarbon radical comprising from 12 to 24 carbon atoms.

Advantageously, $R_1$ represents a linear or branched alkylene radical containing 1 to 6 carbon atoms substituted with an amide radical of formula (II), or else a hydrogen atom. More preferably still, $R_1$ represents a linear or branched alkylene radical containing 1 to 6 carbon atoms substituted with an amide radical of formula (II).

When $R_1$ represents a linear or branched alkylene radical containing 1 to 6 carbon atoms substituted with an amide radical of formula (II), the arrow advantageously represents a covalent bond between the nitrogen atom of the radical of formula (II) and one of the carbon atoms of the alkylene radical.

According to an embodiment of the invention, the alkyl or alkylene radical of the $R_1$ group preferably comprises 2 to 4 carbon atoms, more preferably still, 2 carbon atoms.

Furthermore, whatever their nature, $R_1$, $R_2$ and $R_2'$ advantageously represent, independently of one another, a linear or branched hydrocarbon radical comprising from 14 to 22 carbon atoms, preferably from 14 to 20 carbon atoms.

Furthermore, whatever the nature of $R_1$, and whatever the number of carbon atoms of $R_2$ and $R_2'$, the hydrocarbon radicals of $R_2$ and $R_2'$ may comprise, independently of one another, a number of unsaturated bonds ranging from 1 to 6, preferably from 1 to 4. As a further preference, the hydrocarbon radicals of $R_2$ and $R_2'$ comprise from 1 to 3, and preferably 1 or 2, unsaturated bonds. Alternatively, the hydrocarbon radicals of $R_2$ and $R_2'$ may be saturated, which means to say have no unsaturated bonds.

As indicated hereinabove, $R_2$ and $R_2'$ may be identical or different. Advantageously, $R_2$ and $R_2'$ are identical.

According to an embodiment of the invention, the amide of formula (I) may be selected from the group consisting of oleamide, stearamide, N,N'-ethylene bis(oleamide), N,N'-ethylene bis(steramide) and mixtures of these amides. Advantageously, the amide of formula (I) is N,N'-ethylene bis(oleamide). Such compounds are commercially available, for example stearamide is marketed under the trade name "Crodamide SR" by the company Croda, N,N'-ethylene bis(oléamide) is marketed under the trade name "Crodamide EBO" by the company Croda, N,N'-ethylene bis(stearamide) is marketed under the trade name "Crodamide EBS" by the company Croda.

According to an embodiment of the invention, the content of amide of formula (I) may be within a range extending from 1 to 15 phr, preferably from 2 to 10 phr, preferably from 3 to 8 phr, preferably between 3 and 6 phr.

The inventors have thus been able to demonstrate that the invention makes it possible to lighten the tire by reducing the thicknesses of the sidewall in the zones not covered by the protrusions and, against all expectation, to maintain satisfactory properties in terms of endurance, or even improve these.

BRIEF DESCRIPTION OF THE DRAWINGS

Further details and advantageous features of the invention will become apparent hereinafter from the description of exemplary embodiments of the invention, in particular with reference to the following figures in which.

DETAILED DESCRIPTION OF THE DRAWINGS

In order to make them easier to understand, the figures are not shown to scale. The invention is illustrated in an application to a tire.

Figure 1:
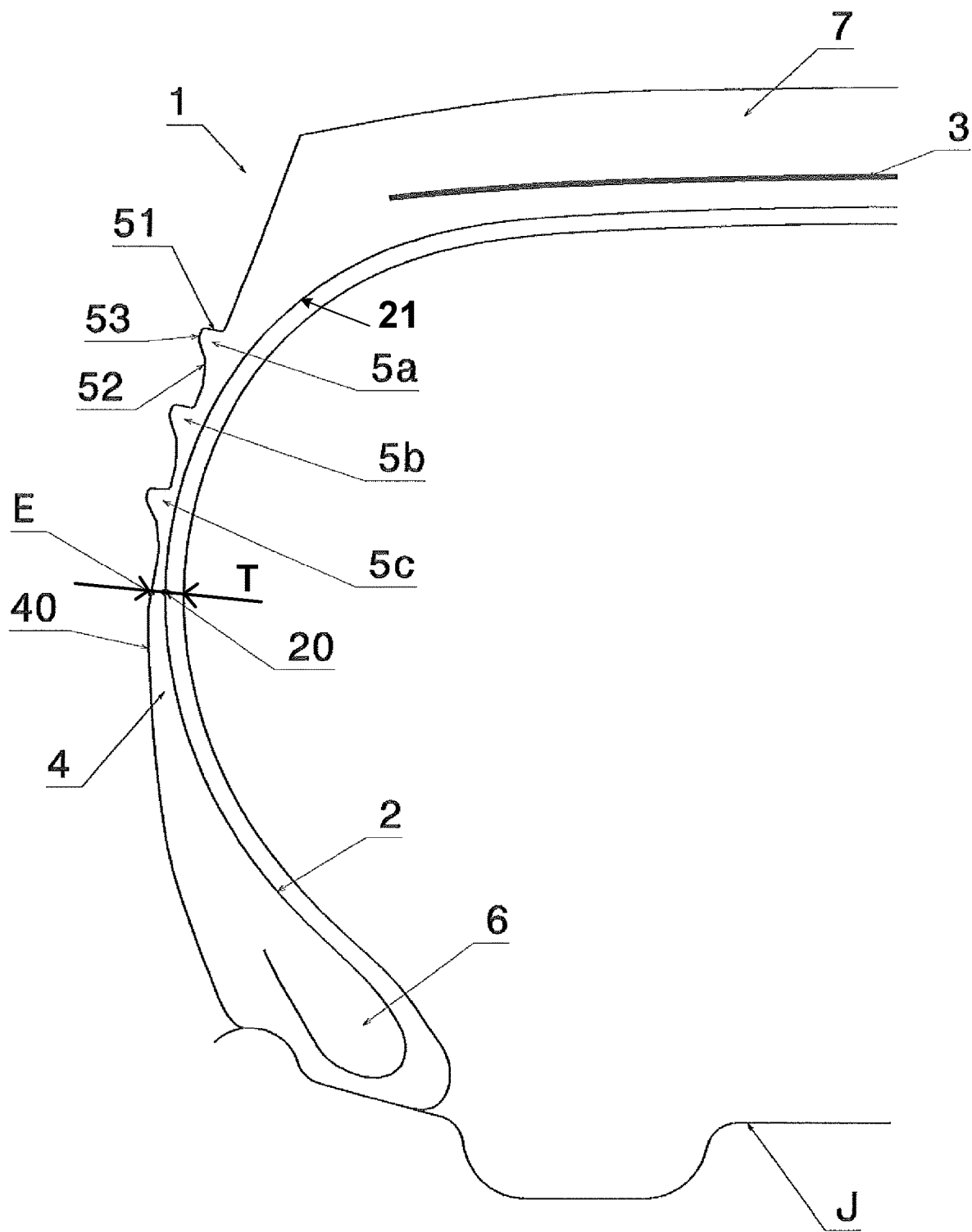
FIG. 1 is a partial meridian view of one particular embodiment of the invention.

FIG. 1 partially shows a tire 1 mounted on its reference rim J and inflated to its nominal pressure, comprising a carcass reinforcement 2 surmounted by a crown reinforcement 3; also visible are a tread 7, a bead 6 and a sidewall 4; the sidewall 4 has an exterior surface 40 on which may be seen three circumferential protrusions 5a, 5b and 5c; let it be emphasized that because the protrusions are circumferential, any meridian section through the tire, taken at any azimuth, will exhibit an identical profile. An equator point E is marked on the sidewall 4 opposite the axially outermost point 20 of the carcass reinforcement, and radially at the same height as the point 20.

With reference more particularly to the protrusion 5a, a radially upper wall 51, a radially lower wall 52, and a connecting wall 53 situated between the radially upper wall 51 and the radially lower wall 52 may be identified on each circumferential protrusion; of course, each protrusion comprises such upper, lower and connecting walls, FIG. 1 having been deliberately spared some of the multiple references that are not required for an understanding of the invention.

Figure 2:
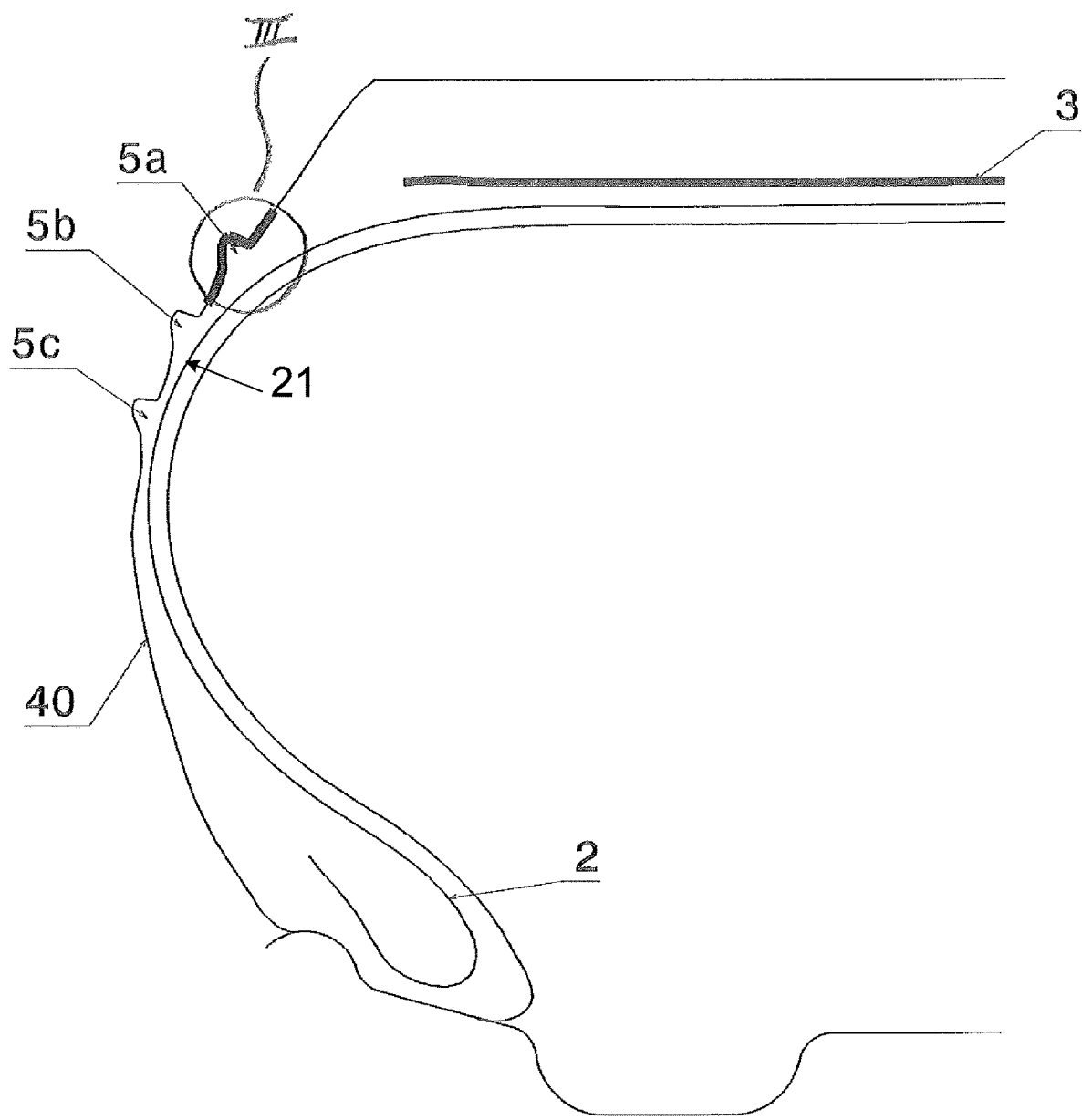
FIG. 2 is a partial meridian view of the embodiment of FIG. 1, with the tire subjected to load.
Figure 3:
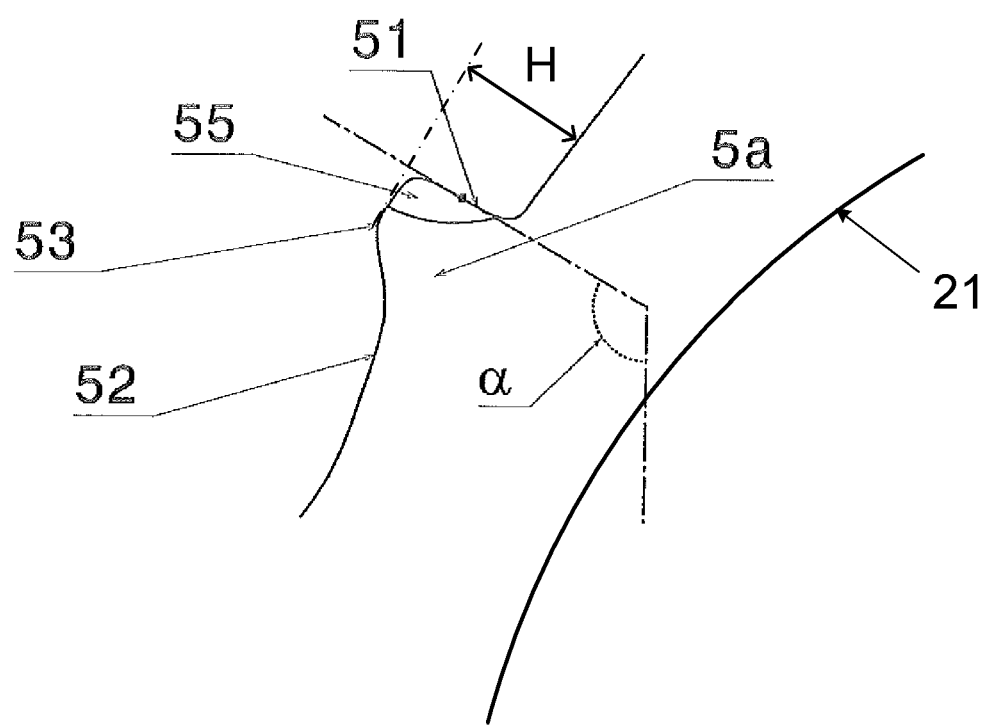
FIG. 3 is an enlargement of zone III indicated in FIG. 2.

FIG. 2 partially shows the profile of the same tire 1 mounted on its reference rim, inflated to its nominal pressure, and this time compressed under the effect of a nominal load. This profile considered in the centre of the contact patch in which the tire is in contact with the ground, commonly is referred to as "compressed profile". FIG. 3 more specifically illustrates the configuration of the radially upper wall, more specifically the zone identified by the circle III in FIG. 2. Let it be recalled that FIG. 2 is a cross section (partial view) on a meridian plane in the middle of the contact patch of the tire in the compressed configuration, namely considered mounted on the reference rim and inflated to the nominal pressure and compressed under its nominal load (reference may be made to the standards, for example the ETRTO standard). The angle α is the angle that the radially exterior wall 51 makes with the radial direction. Because this wall can be slightly curved, by convention and as may be seen in FIG. 3, the angle to be considered is the angle bounded by the tangent mid-way up the height of the wall.

In the embodiment of the invention that is illustrated in FIG. 1, the protrusion has a substantially planar radially upper wall 51. The connecting wall 53 is substantially parallel to the cord 21 of the carcass reinforcement 2. Let it be emphasized that there may be a great deal of variability in the shape of the radially inner wall 52: with a reasonable degree of inconsequentiality regarding the performance of a tire according to the invention, it may be frustoconical, it may have a break in gradient as in FIG. 1, or else it may leave an arc-shaped line in its cross section on a meridian plane. Naturally there are fillet radii. At the junction with the exterior surface 40 of the sidewall 4, each protrusion, viewed in section on a meridian plane, ends in a line that is preferably parallel to the line of the carcass reinforcement 2. By way of example, for a tire of size 12 R 22.5, each protrusion 5 (when the reference 5 or 51, 52, 53 is not followed by a suffix it refers to a generic feature that is valid for all of the protrusions whatever their position) has a base measuring approximately 15 mm, a height H of 5.5 mm, and a connecting wall 53 measuring 3.5 mm.

Let us now move on to the material of which the protrusions 5 are made. The results show a very large decrease in the coefficient of friction p of the compositions in accordance with the invention that contain an amide of formula (I). Thus, the present invention makes it possible to significantly improve the life of tires, since these tires become much less sensitive to external attack. In the exemplary embodiment of the invention, use is made of a compound containing 10 phr of wax, for the first part 55 (see FIG. 3), radially and axially on the outside, of each protrusion 5; this compound with wax lies flush with and forms the entirety of the radially upper wall 51 and part of the connecting wall 53. The rubber compound constituting the sidewalls 4 is also present in the second part, radially and axially on the inside, of each protrusion 5 over a thickness greater than 0.8 mm. A person skilled in the art will readily appreciate that all that is required is for a rubber compound with a low coefficient of friction, namely one that is slippery, to be positioned so that it partially envelops the protrusion, in order to obtain the advantages specific to this preferred embodiment of the invention.

Figure 4:
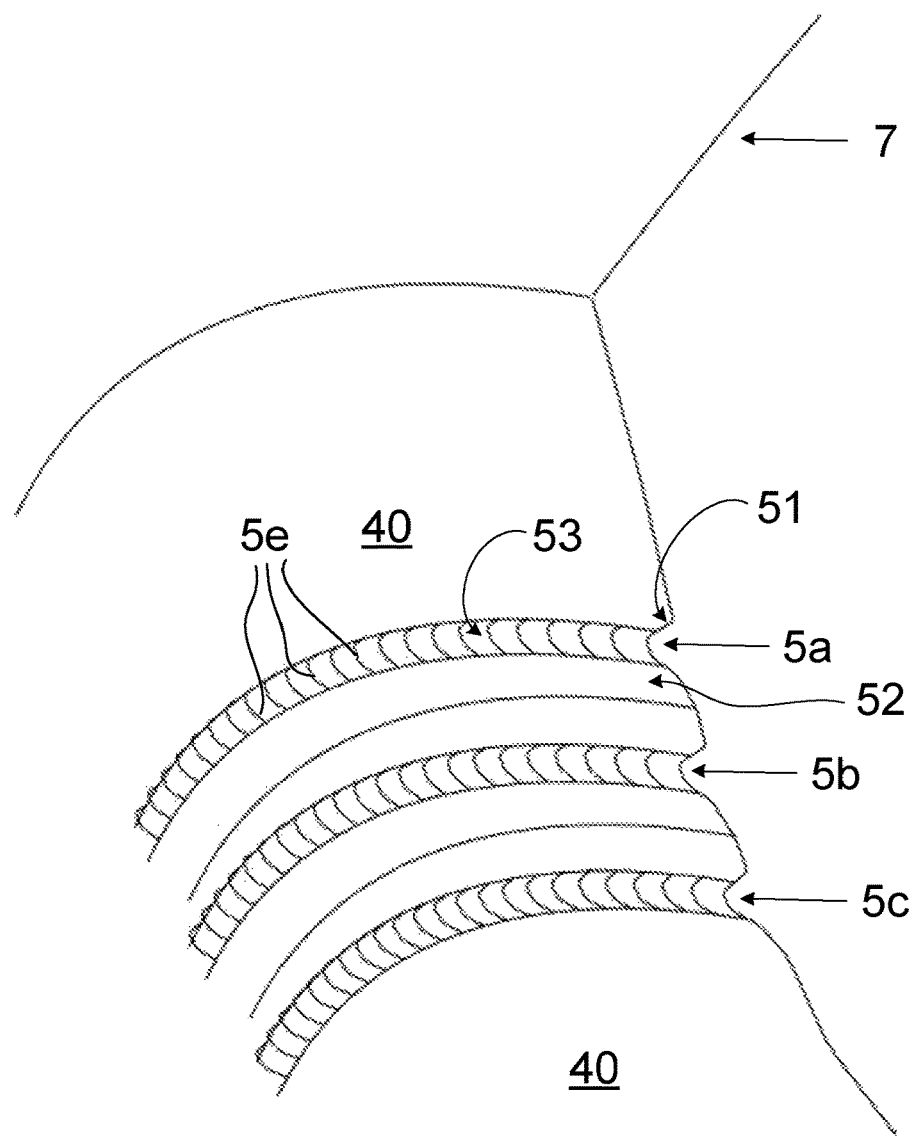
FIG. 4 is a first variant embodiment of the invention.

Other aspects of the particular embodiment of the invention may be adopted. For example, on the connecting wall 53 of the protrusions, it is possible to provide, as shown in FIG. 4, sipes 5e, arranged substantially in a meridian plane, with a radial height of between 0.5 mm and 2 mm, spaced circumferentially by a spacing greater than twice the maximum of the depth of the sipes and the height (H) of the protrusion, and less than 10 mm, preferably of from 1.5 to 3 mm, with an axial depth of between 25% and 50% of the height of the protrusion. This allows better resistance to abrasion when the tire rubs against a kerb. Just some protrusions may thus be provided with sipes, and in that case it is preferably those that are close to the equator that are provided with sipes.

Figure 5:
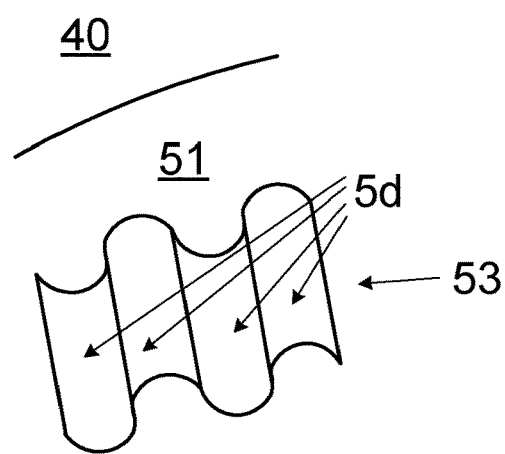
FIG. 5 is a second variant embodiment of the invention.

As a variant, it is possible to provide on the connecting wall 53 of the protrusions, as shown in FIG. 5, a series, in the circumferential direction, of concave and convex surfaces 5d, the peak-to-peak height of which is greater than 2 mm and less than 80% of the height of the protrusion. The concave or convex nature is assessed from the inside of the tire cavity. In FIG. 5, the concave and convex surfaces are half-cylinders with identical radii, but the generatrix may be made up of a series of ellipses or other shapes such as splines. The concave and convex parts may be of different shapes, in which case the convex part preferably has a greater height than the concave part. The actual shape is given by the intersection of the meridian profile of the protrusions and by the circumferential series of concave and convex surfaces 5d. That too makes it possible to better withstand abrasion.

Four variants of tires are tested under the following conditions:

A reference conventional tire (MICHELIN® 12R22.5 XZE2+) denoted T1;

The same conventional tire, except with the sidewall thickness reduced by 2 mm, therefore lighter than T1 by 1.3 kg, denoted T2;

The same conventional tire, except for a sidewall compound doped to 10 phr with wax, denoted T3;

A tire according to the invention, with the thickness reduced by 2 mm (see T2) and comprising three cordons as described in FIGS. 1 and 2, lighter than T1 by 1.1 kg, denoted T4.

A tire with the thickness reduced by 2 mm and with three cordons as described in FIGS. 1 and 2, and a sidewall compound containing 10 phr of wax, denoted T5.

All the tires are inflated to 9 bar and loaded with 3500 kg. Rail-guided running is performed, using by way of element aggressive towards the tire a cylindrical rod of which the end that comes into contact with the tire is a hemisphere, of radius 15 mm, oriented perpendicular to the direction of forward travel of the tire, and making an angle of 50° with respect to the vertical, and positioned to the side of the edge of the tread. The rod is raised progressively and the rod height beyond which the sidewall is pierced is observed. The measurement is repeated on three exemplars of each of the tires T1, T2, T3, T4 and T5, and the mean value is adopted.

The results are given in the following table:

| Tire | Height |
| --- | --- |
| T1 | 125 |
| T2 | 115 |
| T3 | 125 |
| T4 | 125 |
| T5 | 130 |

It is therefore found that the presence of the cordons makes it possible to maintain the performance of the control tire with a 1 kg drop in mass and that the addition of a slippery compound on the exterior edges of the cordons improves the performance whereas on a conventional tire, this compound is neutral.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising; a carcass reinforcement surmounted by a crown reinforcement, itself capped by a tread, the tread being connected to two beads via two sidewalls each having an exterior surface, at least one of the sidewalls comprising at least two circumferential protrusions, each sidewall comprising an equator point situated on the exterior surface of the sidewall radially at the same position as the axially outermost point of the carcass reinforcement in an unladen reference configuration, each circumferential protrusion being bounded by; a planar radially upper wall, a curved radially lower wall, and a connecting wall situated between the planar radially upper wall and the curved radially lower wall, wherein, for each circumferential protrusion: the connecting wall is substantially parallel to the carcass reinforcement considered axially facing the connecting wall, the planar radially upper wall is inclined relative to the radial direction, at least a portion of the curved radially lower wall is substantially parallel to the radial direction, the radially upper wall and curved radially lower wall are asymmetrically configured with respect to one another in the radial direction, the height (H) of each circumferential protrusion, measured in a direction substantially perpendicular to the carcass reinforcement from the exterior surface is greater than the smaller value of 0.8 times the total thickness (T) of the sidewall as measured at the equator (E) and 4 mm, and less than the greater value of 1.6 times the total thickness (T) and 8 mm, in the meridian plane at the center of the contact patch of the tire in a compressed configuration, an angle α formed by the planar radially upper wall with the radial direction is, in the case of the radially outermost protrusion, greater than 95°, and the radially innermost position of the connecting wall of the radially innermost protrusion is situated radially on the outside of the equator point (E).

2. The tire according to claim 1, wherein, for each protrusion, the curvilinear length of the connecting wall is greater than 50% of the height of the protrusion.

3. The tire according to claim 1, wherein, for each protrusion the curvilinear length of the connecting wall is greater than 1.5 times the height of the protrusion.

4. The tire according to claim 3, wherein, for each protrusion the curvilinear length of the connecting wall is greater than 2.5 times the height of the protrusion.

5. The tire according to claim 1, wherein each sidewall comprises at least three protrusions (5 a, 5 b, 5 c).

6. The tire according to claim 1, wherein the angle α is, for the radially outermost protrusion, greater than 105°.

7. The tire according to claim 1, wherein the angle α is decreasing in value when moving on from one protrusion to the next in the direction toward the equator.

8. The tire according to claim 1, wherein the smallest value for the angle (α), for all of the protrusions is greater than 90°.

9. The tire according to claim 1, wherein each protrusion is made up of the same rubber compound as the part of the sidewall that forms the exterior surface.

10. The tire according to claim 1, wherein each protrusion has sipes arranged substantially in a meridian plane, with a radial height of between 0.5 mm and 2 mm, spaced circumferentially by a spacing greater than twice the maximum of the depth of the sipes and the height (H) of the protrusion, and less than 10 mm, with an axial depth of between 25% and 50% of the height of the protrusion.

11. The tire according to claim 1, wherein each protrusion has, on its connecting wall, in the circumferential direction, a series of concave and convex surfaces, the peak-to-peak height of which is greater than 2 mm and less than 80% of the height of the protrusion.

12. The tire according to claim 1, wherein each protrusion comprises a rubber composition that contains at least 8 phr of anti-ozone wax.

13. The tire according to claim 1, wherein each protrusion comprises a rubber compound containing an amide of formula (I):

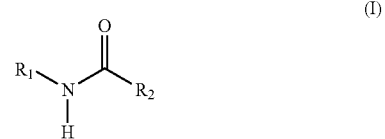

where $R_1$ represents:
a linear or branched alkylene radical containing 1 to 6 carbon atoms substituted with an amide radical of formula (II),

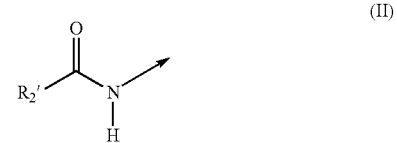

in which:
$R_2'$ represents a linear or branched hydrocarbon radical comprising from 12 to 24 carbon atoms, and the arrow (→) represents the point of attachment of the amide radical of formula (II);
a linear or branched alkyl radical comprising from 1 to 6 carbon atoms, or
a hydrogen atom:
where $R_2$ represents a linear or branched hydrocarbon radical comprising from 12 to 24 carbon atoms.

* * * * *